(12) United States Patent
Koganezawa

(10) Patent No.: US 6,328,862 B1
(45) Date of Patent: Dec. 11, 2001

(54) OZONE GENERATING ELECTROLYSIS CELL AND METHOD OF FABRICATING THE SAME

(75) Inventor: Akihisa Koganezawa, Shizuoka (JP)

(73) Assignee: Take-One Office, Ltd., Tokyo (JP)

(*) Notice: Subject to any disclaimer, the term of this patent is extended or adjusted under 35 U.S.C. 154(b) by 0 days.

(21) Appl. No.: 09/598,165

(22) Filed: Jun. 21, 2000

(30) Foreign Application Priority Data

Dec. 22, 1999 (JP) .................................................. 11-365414

(51) Int. Cl.[7] .................................................... C25B 9/08
(52) U.S. Cl. ....................................... 204/252; 204/290.14
(58) Field of Search ................................ 204/252, 290.14, 204/253

(56) References Cited

U.S. PATENT DOCUMENTS 5,529,683   6/1996   Critz et al. .
5,993,618 * 11/1999   Schulze et al. ...................... 204/237

FOREIGN PATENT DOCUMENTS

| 0 318 442 | 5/1989 | (EP) . |
| 0 718 903 | 6/1996 | (EP) . |
| 8-213027 | 8/1996 | (JP) . |
| 11-1789 | 1/1999 | (JP) . |
| 11-131276 | 5/1999 | (JP) . |

* cited by examiner

Primary Examiner—Kathryn Gorgos
Assistant Examiner—Thao Tran
(74) Attorney, Agent, or Firm—Wenderoth, Lind & Ponack, L.L.P.

(57) ABSTRACT

An electrolysis cell (1) includes an anodic plate (3), a cathodic plate (4) and a PEM (2) sandwiched between these plates (3, 4). The cell also includes a layer (5) containing a catalyst for generation of ozone. The layer (5) contains lead dioxide and PTFE and is interposed between the anodic plate (3) and the PEM (2). At least some portion of the anodic plate surface contacting the layer (5) is coated with platinum (6). The electrode plates (3,4) are not only electrically conductive but also in some portions are permeable to gas and liquid. A PTFE dispersion, lead dioxide powder and volatile dispersion medium are mixed are kneaded. The PTFE concentration relative to lead dioxide in the mixture is 5% by weight. The kneaded mixture (20) is spread to be a half-dried sheet (20) on paraffin paper plate (22). The half-dried sheet (20) is left standing or heated in an atmosphere at or below 100° C. to volatilize the dispersion medium and become dry. The paper (22) coated with the dry film (20) is cut in a predetermined shape. Then the cut dry film (20) is peeled off the cut paper (22). The peeled-off dry film (20) is used as the layer (5). To make a half-dried film, the kneaded mixture (20) may be spread onto the anodic plate or the PEM, wherein the step of peeling off is omitted. Such a half dried film is also left standing or heated to volatilize the dispersion medium at or below 100° C.

24 Claims, 5 Drawing Sheets

US 6,328,862 B1

OZONE GENERATING ELECTROLYSIS CELL AND METHOD OF FABRICATING THE SAME

FIELD OF THE INVENTION

The present invention relates to improvements in an ozone generating electrolysis cell employing lead dioxide as a catalyst in generating ozone through the electrolysis of water, and improvements in a method of fabricating an ozone generating electrolysis cell. More particularly, the present invention relates to improvements in a method of forming the catalyst.

BACKGROUND OF THE INVENTION

A method of industrial production of ozone using an electrolysis cell has been generally known. FIG. 5 is a typical sectional view of a central part of a conventional electrolysis cell 101. The electrolysis cell 101 includes a plate-shaped anode (hereinafter referred to as "anodic electrode plate") 103, a plate-shaped cathode (hereinafter referred to as "cathodic electrode plate") 104, and a proton exchange membrane (hereinafter abbreviated to "PEM") 102 sandwitched between the anodic electrode plate 103 and the cathodic electrode plate 104.

The anodic electrode plate 103 is a mesh or porous structure permeable to air and water. A basic material of the anodic electrode plate 103 is titanium. As shown in FIG. 5, at least a surface of the anodic electrode plate 103 facing the PEM 102 is coated with a platinum layer 106. The platinum layer 106 can be formed by a plating process. A catalyst layer 105 containing lead dioxide is interposed between the platinum layer 106 and the PEM 102.

A basic material of the cathodic electrode plate 104 is a stainless steel or titanium. The cathodic electrode plate 104 is a mesh or porous structure permeable to air and water. As shown in FIG. 5, a surface of the cathodic electrode plate 104 facing the PEM 102 is coated with a hydrogen generating catalyst layer 107 containing a metal, such as platinum.

An anode collector plate 108 and a cathode collector plate 109 are attached to the outer surfaces of the electrode plates 103 and 104, respectively, to connect the electrode plates 103 and 104 to a power source. The components laminated between the anode collector plate 108 and the cathode collector plate 109 are compressed to connect the same electrically. The collector plates 108 and the cathode collector plate 109 are provided with a plurality of openings 110 and a plurality of openings 111, respectively. Thus, a plurality of water passages or air passages are formed between the exterior of the electrolysis cell 101 and the PEM 102 through the electrode plates 103 and 104 and the collector plates 108 and 109.

Water is supplied through the plurality of openings 110 to the electrolysis cell 101 and electric current is supplied through the electrode plates 103 and 104 for the electrolysis of water. Then, hydrogen ions migrate from anodic electrode plate 103 through the PEM 102 toward the cathodic electrode plate 104, electrons are supplied to hydrogen ions by the cathodic electrode plate 104 to produce hydrogen. At the same time, oxygen is produced at the anodic electrode plate 103. Part of the oxygen is converted by the catalytic action of the catalyst layer 105 containing lead dioxide into ozone.

As mentioned above, the catalyst layer 105 containing lead dioxide of the electrolysis cell 101 augments ozone generation. Therefore, ozone generating efficiency and the reliability of the electrolysis cell 101 are greatly dependent on the condition of the catalyst layer 105. In the conventional electrolysis cell 101, a lead dioxide film is deposited on the surface of the anodic electrode plate 103 by electrodeposition. The platinum layer 106 is used to improve the adhesion of lead dioxide deposited on the anodic electrode plate 103 by electrodeposition.

The lead dioxide film thus formed is hard and inflexible. Consequently, the lead dioxide film has a drawback that the same is subject to cracking and comes off the anodic electrode plate 103. Therefore it is impossible to mass-produce anodic electrode plates of a desired shape by depositing lead dioxide in a lead dioxide film on a surface of a titanium plate having a large area by electrodeposition and cutting the titanium plate coated with the lead dioxide film in the desired shape because of the foregoing drawback of the lead dioxide film. Therefore, a conventional method makes titanium plates of a desired shape by cutting a large titanium plate and individually forming lead dioxide films on the titanium plates by electrodeposition to make anodic electrode plates, which is unsuitable for mass production and increases the manufacturing cost of the electrolysis cell.

Physical irregularities are liable to be formed in a film formed by electrodeposition, a film formed by electrodeposition is liable to have irregular resistance and it is difficult to form a smooth film of a uniform film quality by electrodeposition. When a lead dioxide film having physical irregularities and a non-uniform film quality is pressed against a PEM, portions having different resistance of the lead dioxide film are pressed in different degrees of contact against the PEM. Consequently, the PEM has portions differing from each other in electric conductivity. Portions having a high resistance generate heat when a current flows therethrough. The heat generated by the PEM reduces ozone generating efficiency and it is possible that the heat damages the PEM. Therefore, conditions for electrodeposition including the temperature and the concentration of an electrodeposition solution are controlled severely and the conditions are adjusted minutely by manual operations to form a uniform film by electrodeposition, which increases the manufacturing cost.

Since the electrodeposition of a lead dioxide film is performed in an oxygen atmosphere, the energy level of the crystal lattice of lead dioxide tends to be dependent on how the conditions were during electrodeposition. The energy level of a lead dioxide film as deposited by electrodeposition falls with time and hence the physical properties of lead dioxide are subject to change with time. It is actually experienced that the ozone generating efficiency of the ozone generating electrolysis cell is dependent on time elapsed after incorporation of the lead dioxide film formed by electrodeposition into the electrolysis cell, (i.e., whether a current is supplied immediately after incorporation of the lead dioxide film into the electrolysis cell, or whether a current is supplied some time after incorporation of the lead dioxide film into the electrolysis cell, electrolysis is either started immediately after the commencement of supplying water to the electrolysis cell or electrolysis is started some time after the commencement of supplying water to the electrolysis cell, respectively) and operating conditions of the electrolysis cell. Such performance of the electrolysis cell is a significant problem in the reliability of the electrolysis cell.

To cope with those problems in the electrodeposited lead dioxide film, a technique disclosed in Japanese Patent Laid-Open No. Hei 8-213027 (Inventor: Kato) employs a flexible catalyst sheet containing lead dioxide. More concretely, a catalyst sheet is formed by filling numerous voids in an oriented, porous polytetrafluoroethylene sheet (PTFE sheet) with a mixture of lead dioxide and a solid electrolytic resin, wherein the PEM is also formed from this resin. The catalyst sheet, i.e., anodic catalyst, a PEM and a cathodic layer, i.e. a carbon paper sheet containing platinum, are superposed in that order to form a superposed structure. The superposed structure is compressed and heated at a temperature in the range of 120 to 140° C. by hot pressing to obtain a laminated structure. The laminated structure is sandwiched between an anodic electrode plate and a cathodic electrode plate to complete an electrolysis cell.

A technique disclosed in Japanese Patent Laid-open No. Hei 11-131276 (Inventor: Mitsuta et al.) spreads lead dioxide powder on a PTFE sheet laminated to a PEM to form a catalyst sheet. An anode collector plate, an anodic electrode plate, the catalyst sheet containing lead dioxide, a PEM, a cathodic electrode plate and a cathode collector plate are superposed in that order to form a superposed structure, and the superposed structure is compressed and heated at 160° C. by hot pressing to fabricate a electrolysis cell.

In the electrolysis cells mentioned in those cited references, i.e., Japanese Patent Laid-open No. Hei 8-213027 (Inventor: Kato) and Japanese Patent Laid-open No. Hei 11-131276 (Inventor: Mitsuta et al.), employing the flexible catalyst sheet containing lead dioxide, problems attributable to the cracking and falling off of the electrodeposited lead dioxide film can be solved and electrolysis cells can be produced at a high efficiency. Since the electrolysis cell is provided with the catalyst sheet having a uniform quality, deterioration of reliability due to irregularity in energy level and physical properties can be avoided. However, lead dioxide is very highly oxidizing and very susceptible to reduction and is also a substance very unstable under heat. The techniques mentioned in the foregoing cited references use a heating process or the hot processing that heats the superposed structure at a temperature in the range of 120 to 160° C. in forming the catalyst sheet containing lead dioxide. Therefore, it is possible that lead dioxide is decomposed during the heating process. If the surface of the catalyst sheet has regions in which the thermal decomposition of lead dioxide has occurred, the surface of the catalyst sheet has irregular resistance distribution and the operation of the electrolysis cell including this catalyst sheet is unstable. Although different in cause from the electrodeposited lead dioxide film, such a catalyst sheet, similarly to the electrodeposited lead dioxide film, deteriorates the reliability of the electrolysis cell.

SUMMARY OF THE INVENTION

Accordingly, it is an object of the present invention to disclose techniques relating to an electrolysis cell provided with a catalyst layer containing lead dioxide processed by a process at temperatures not higher than 100° C. and a method of fabricating such an electrolysis cell to provide an electrolysis cell with high reliability at a low manufacturing cost.

In one aspect of the invention, provided is an ozone generating electrolysis cell comprising an anodic electrode plate, a cathodic electrode plate, and a membrane which separates these plates from one another in the cell and is sandwiched between the anodic electrode plate and the cathodic electrode plate. The membrane is a solid electrolytic film, an ozone generating catalyst layer is interposed between the membrane and the anodic electrode plate, and the ozone generating catalyst layer contains lead dioxide and PTFE. The anodic electrode plate is a conductive structure permeable to gas and liquid, and at least a surface of the anodic electrode plate in contact with the ozone generating catalyst layer is covered with a platinum layer. The ozone generating catalyst layer is a dry sheet formed in an environment at or below 100° C. by performing the following steps: kneading a mixture of a PTFE dispersion, lead dioxide powder and a volatile dispersion medium into a kneaded mixture; shaping or spreading the kneaded mixture into a half-dried sheet; and fully volatilizing the dispersion medium.

In another aspect of the invention provided is a method of fabricating an ozone generating electrolysis cell, wherein the cell comprises an anodic electrode plate, a cathodic electrode plate, and a membrane which separates these plates from one another in the cell and is sandwiched between the anodic electrode plate and the cathodic electrode plate. The membrane is a solid electrolytic film, an ozone generating catalyst layer is interposed between the membrane and the anodic electrode plate, and the ozone generating catalyst layer contains lead dioxide and PTFE. The anodic electrode plate is a conductive structure permeable to gas and liquid, and at least a surface of the anodic electrode plate in contact with the ozone generating catalyst layer is covered with a platinum layer. The ozone generating catalyst layer is a dry sheet formed in an environment at or below 100° C. by performing the following steps: kneading a mixture of a PTFE dispersion, lead dioxide powder and a volatile dispersion medium into a kneaded mixture; shaping or spreading the kneaded mixture into a half-dried sheet; and fully volatilizing the dispersion medium. The method includes the steps of:

a) mixing the lead dioxide powder, the PTFE dispersion and the volatile dispersion medium, and stirring or kneading the mixture to obtain the kneaded mixture;

b1) spreading the kneaded mixture so as to form the half-dried sheet on the suitable plate;

b2) drying the half-dried sheet to make the dry sheet, b3) peeling the dry sheet off the suitable plate; and b4) sandwiching the dry sheet between the anodic electrode plate and the membrane to form the ozone generating catalyst layer. In this aspect, the suitable plate may preferably be a paper plate.

In another aspect of the invention provided is a method of fabricating an ozone generating electrolysis cell, wherein the cell comprises an anodic electrode plate, a cathodic electrode plate, and a membrane which separates these plates from one another in the cell and is sandwiched between the anodic electrode plate and the cathodic electrode plate. The membrane is a sold electrolytic film, an ozone generating catalyst layer is interposed between the membrane and the anodic electrode plate, and the ozone generating catalyst layer contains lead dioxide and PTFE. The anodic electrode plate is a conductive structure permeable to gas and liquid, and at least a surface of the anodic electrode plate in contact with the ozone generating catalyst layer is covered with a platinum layer. The ozone generating catalyst layer is a dry sheet formed in an environment at or below 100° C. by performing the following steps: kneading a mixture of a PTFE dispersion, lead dioxide powder and a volatile dispersion medium into a kneaded mixture; shaping or spreading the kneaded mixture into a half-dried sheet; and fully volatilizing the dispersion medium. The method includes the steps of:

a) mixing the lead dioxide powder, the PTFE dispersion and the volatile dispersion medium, and stirring or kneading the mixture to obtain the kneaded mixture; and c) spreading the kneaded mixture so as to for the half-dried sheet on the membrane.

In another aspect of the invention provided is a method of fabricating an ozone generating electrolysis cell, wherein the cell comprises an anodic electrode plate, a cathodic electrode plate, and a membrane which separates these plates from one another in the cell and is sandwiched between the anodic electrode plate and the cathodic electrode plate. The membrane is a solid electrolytic film, an ozone generating catalyst layer is interposed between the membrane and the anodic electrode plate, and the ozone generating catalyst layer contains lead dioxide and PTFE. The anodic electrode plate is a conductive structure permeable to gas and liquid, and a least a surface of the anodic electrode plate in contact with the ozone generating catalyst layer is covered with a platinum layer. The ozone generating catalyst layer is a dry sheet formed in an environment at or below 100° C. by performing the following steps: kneading a mixture of a PTFE dispersion, lead dioxide powder and a volatile dispersion medium into a kneaded mixture; shaping or spreading the kneaded mixture into a half-dried sheet; and fully volatilizing the dispersion medium. The method includes the steps of:

a) mixing the lead dioxide powder, the PTFE dispersion and the volatile dispersion medium, and stirring or kneading the mixture to obtain the kneaded mixture; and d) spreading the kneaded mixture so as to form the half-dried sheet on the anodic electrode plate.

DESCRIPTION OF THE PREFERRED EMBODIMENTS

Basic Construction of Electrolysis Cell

Figure 5:
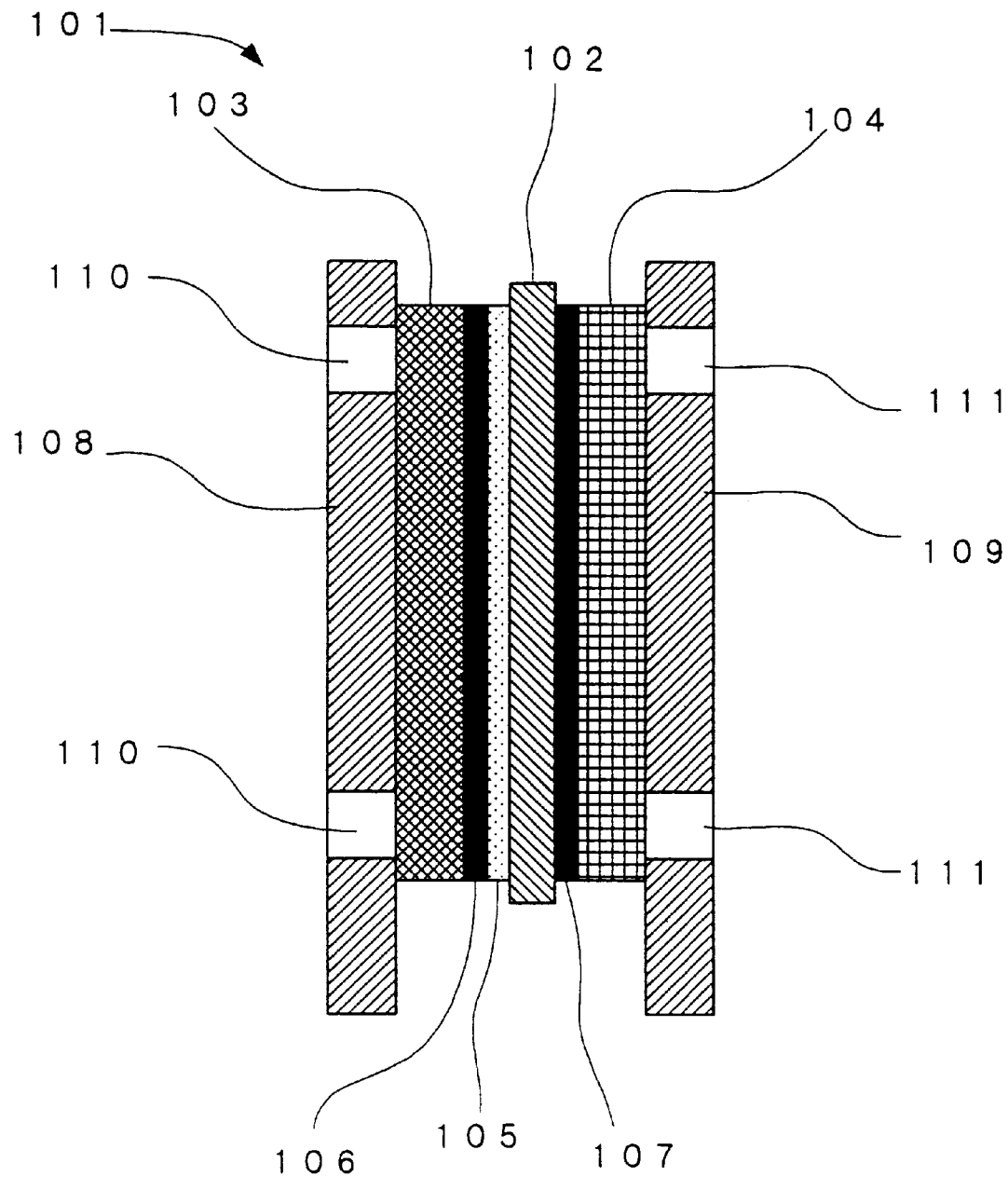
FIG. 5 is a typical sectional view of an electrolysis cell element, i.e., a principal part, included in a conventional electrolysis cell.

An electrolysis cell element 1 in a preferred embodiment according to the present invention is substantially similar in basic construction to the conventional electrolysis cell element shown in FIG. 5. However, the electrolysis cell element of the present invention differs greatly from the conventional electrolysis cell element in the morphology of an anodic catalyst layer and method of forming the anodic catalyst layer. The basic construction of the electrolysis cell 1 in the preferred embodiment will be described with reference to FIG. 1.

Figure 1:
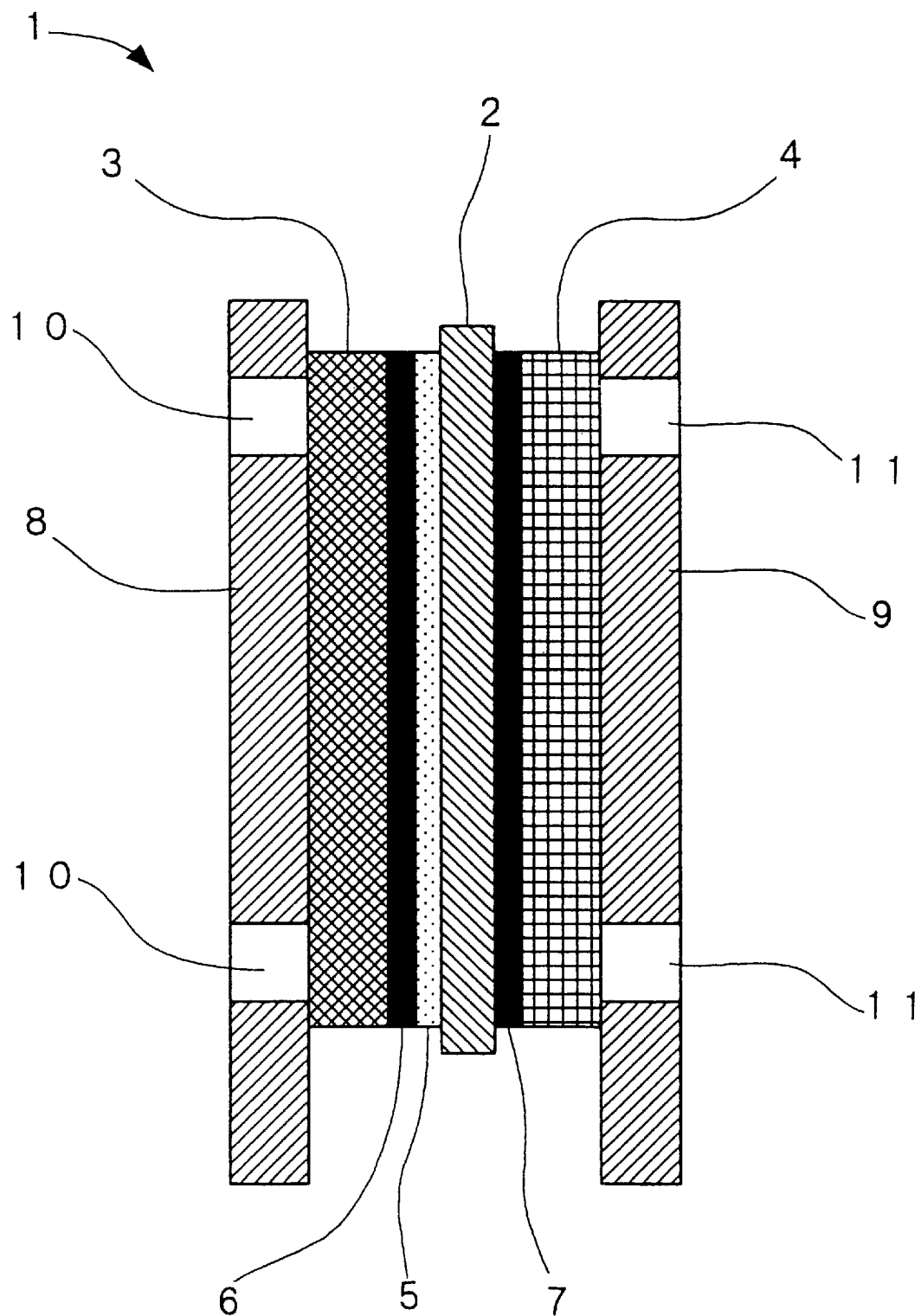
FIG. 1 is a typical sectional view of an electrolysis cell element, i.e., a principal part, included in an electrolysis cell in a preferred embodiment according to the present invention.

Referring to FIG. 1, a PEM 2 is a membrane of a perfluorosulfonic acid resin membrane, such as NAFION® #117 commercially available from E.I. DuPont de Nemours and Company, 1007 Market Street, Wilmington Del., 19898, USA. An anodic electrode plate 3 is formed by superposing four expanded titanium sheets respectively of different types in four layers. Porosities or permeabilities of the four expanded titanimun sheets may be different from each other. One of the four expanded titanium sheets, contiguous with the PEM 2 is coated with a platinum layer 6 by plating. A cathodic electrode plate 4 is a stainless steel mesh as a basic material. A cathodic catalyst layer 7 is a carbon paper sheet having a surface containing platinum. The cathodic catalyst layer 7 is sandwiched between the cathodic electrode plate 4, i.e., the stainless steel mesh, and the PEM 2 with the surface containing platinum facing the PEM 2. A catalyst sheet 5 containing lead dioxide, which is an essential component of the present invention, is sandwiched between the PEM 2 and an anodic electrode plate 3. An anodic collector plate 8, i.e., a titanium plate, provided with openings 10 is disposed contiguously with the outer surface of the anodic electrode plate 3. A cathodic collector plate 9, i.e., a stainless steel plate 9, provided with openings 11 is disposed contiguously with the outer surface of the cathodic electrode plate 4. Those components are thus combined to form the electrolysis cell element 1. The openings 10 and 11 allow the passages of water and gas.

Figure 2:
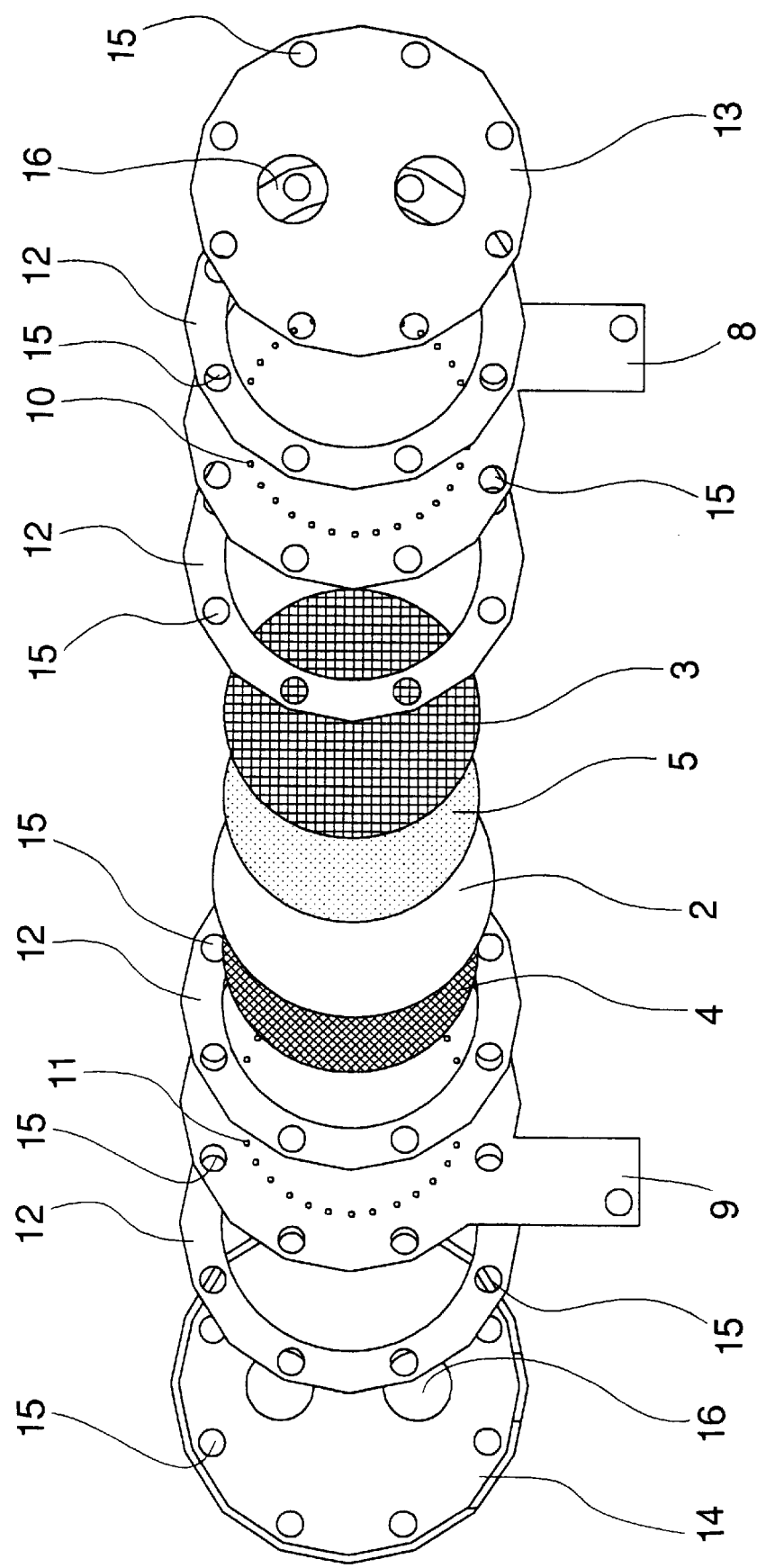
FIG. 2 is an exploded perspective view of the electrolysis cell in the preferred embodiment.
Figure 3:
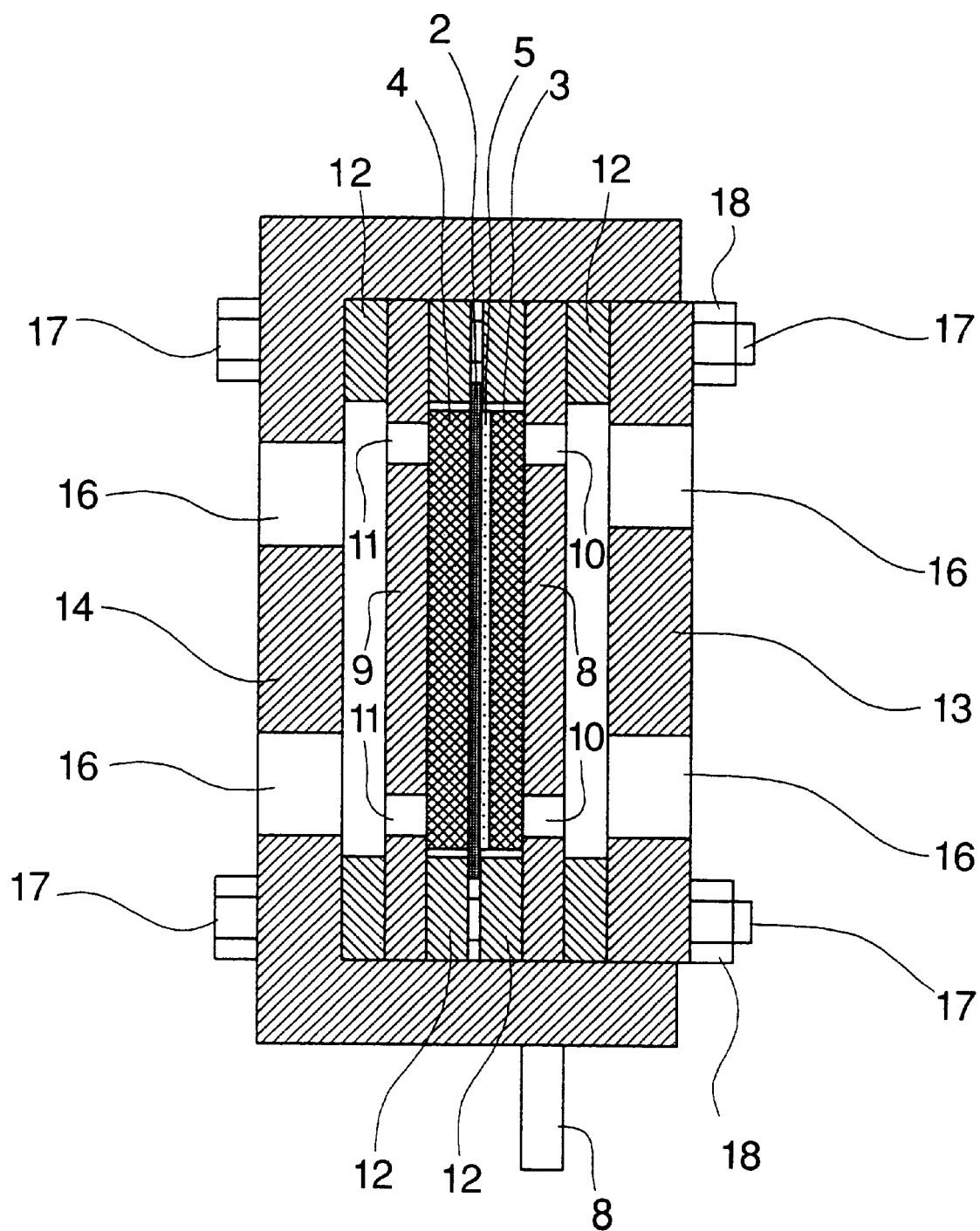
FIG. 3 is a typical sectional view of the electrolysis cell in the preferred embodiment.

FIG. 2 is an exploded perspective view of the electrolysis cell and FIG. 3 is a typical sectional view of the electrolysis cell. When assembling the electrolysis cell element 1, the catalyst sheet 5 containing lead dioxide is sandwiched between the anodic electrode plate 3 and the PEM 2. As shown in FIG. 2, the components of the electrolysis cell element 1 have shapes substantially resembling circular plates, respectively, and some of the components are provided with a plurality of through holes 15 in their peripheral portions to receive bolts therethrough. Gaskets 12 of a ozone proof material, such as a fluorocarbon resin, are interposed properly between the superposed components to prevent leakage through interfaces between the superposed components. The electrolysis cell element 1 is sealed in a closed casing having casing members 13 and 14 by using the bolts and the gaskets 12. The construction of the electrolysis cell element 1 will be more specifically described. The casing members 13 and 14 are made of an ozone-proof material. The casing members 13 and 14 are provided with a plurality of through holes 16 to allow a gas or water to flow into and out of the through holes 10 and 11 of the collector plates 8 and 9. Bolts 17 (FIG. 3) are passed through the through holes 15 of the casing members 13 and 14 and the components, and nuts 18 are screwed onto the bolts 17 to finally correctly position, superpose and fasten the components together in a closed structure.

In this embodiment, the anodic collector plate 8 and the anodic electrode plate 3 are joined together by holding the anodic collector plate 8 and the anodic electrode plate 3 in close contact with each other and supplying a current through the anodic collector plate 8 and the anodic electrode plate 3 for welding thereof. When the anodic collector plate 8 and the anodic electrode plate 3 are thus welded together, a conducting path of a low resistance can be secured inside between the anodic collector plate 8 and the anodic electrode plate 3 even if the anodic collector plate 8 and the anodic plate 3 of titanium are oxidized by ozone at their outer superficial portions or coated at such portions with oxide films. Such oxides have high resistance. If the anodic collector plate 8 and the anodic electrode plate 3 are held merely in contact with each other, the anodic collector plate 8 and the anodic electrode plate 3 will be unsatisfactorily electrically connected and electrical resistance of the anodic collector plate 8 and the anodic electrode plate 3 will increase when the surfaces thereof are oxidized.

On the other hand, the anodic electrode plate 3 and the catalyst sheet 5 containing lead dioxide, and the catalyst sheet 5 containing lead dioxide and the PEM 2 cannot be welded together. Therefore, the anodic electrode plate 3, catalyst sheet 5 and PEM 2 are kept pressed together with the bolts 17 and the nuts 18 for maintaining electrical contact. The surface of the anodic electrode plate 3 facing the PEM 2 is coated with the platinum layer 6 to prevent the anodic oxidation of the surface of the anodic electrode plate 3 from contacting the catalyst sheet 5 containing lead dioxide, and thus preventing an increase in the electrical resistance of such surface. The cathodic electrode plate 4 and the PEM 2 are also kept pressed together for maintaining electrical contact. A method of fabricating the electrolysis cell according to the present invention will be described principally in terms of a process of making the catalyst sheet 5 containing lead dioxide. In the following description, the catalyst sheet containing lead dioxide will be refereed to as "lead dioxide sheet" for convenience.

Process of Making Lead Dioxide Sheet FIGS. 4(A) to 4(D) show the steps of a process of making the lead dioxide sheet.

Figure 4:
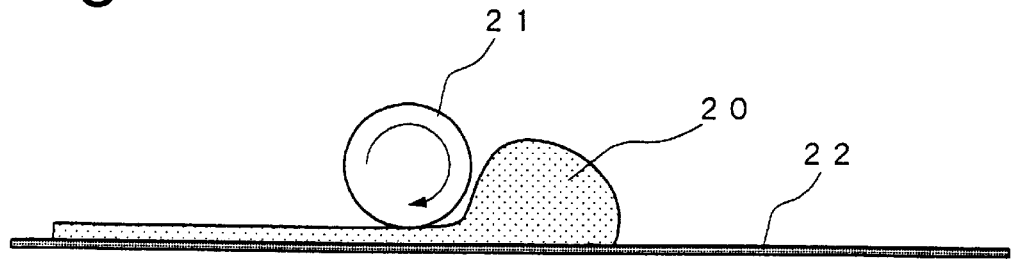
FIGS. 4A–D are typical views of assistance in explaining a process of fabricating a catalyst sheet containing lead dioxide included in the electrolysis cell in the preferred embodiment.
Figure 4:
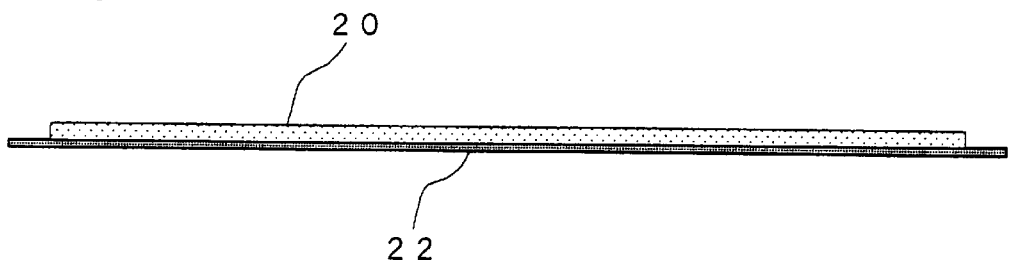
Figure 4:
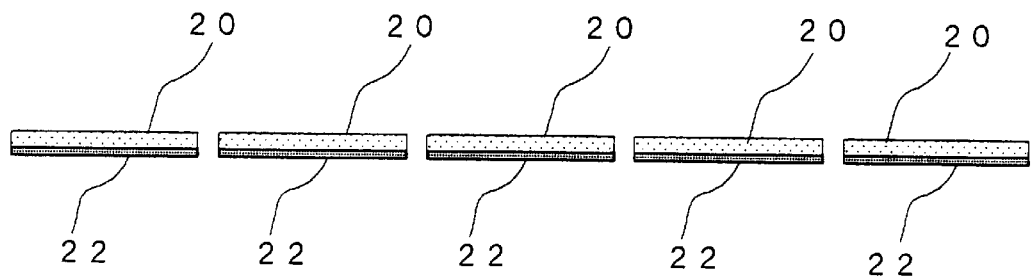
Figure 4:
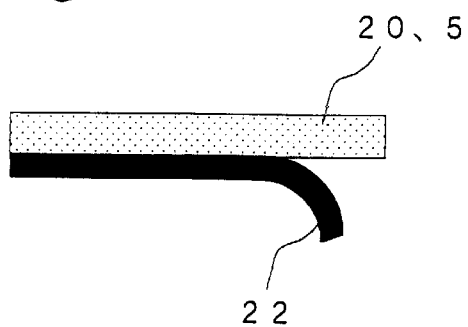

In the step shown in FIG. 4(A), lead dioxide powder and a PTFE dispersion, such as the one known as a tradename "MDF PTFE 30-J" and commercially available from DuPont-Mitsui Fluorochemicals Co., Ltd., are mixed. The PTFE concentration relative to lead dioxide is about 5% by weight.

An appropriate amount of ethanol and the mixture of lead dioxide powder and the PTFE dispersion are mixed and stirred or kneaded to prepare a slurry of a mixture 20. Appropriate volume ratio between ethanol and the mixture is, for example, 1:1. The slurry of the mixture 20 is applied to a paraffin paper sheet 22 with a roller 21 of a vinyl chloride resin in a 300 $\mu$m ($300 \times 10^{-6}$ meter) thick film of the mixture 20.

Any dispersion medium other than ethanol may be used provided that the dispersion medium is capable of dispersing the mixture at temperatures not higher than 100° C. A possible dispersion medium is, for example, isopropyl alcohol.

In the step shown in FIG. 4(B), the film of the mixture 20 is left as it is to let ethanol volatilize for natural drying. The film of the mixture 20 may be heated at a temperature not higher than 100° C. for hot drying.

In the step shown in FIG. 4(C), the paraffin paper sheet 22 coated with the dry film of the mixture 20 is cut in a shape corresponding to that of the anodic electrode plate 3.

In the step shown in FIG. 4(D), the cut film of the mixture 20 is peeled off the cut paraffin paper sheet 22 to obtain a lead dioxide sheet.

The lead dioxide sheet obtained by the process shown in FIGS. 4(A) to 4(D) is sandwiched between the anodic electrode plate 3 and the PEM 2. The anodic collector plate 8, the anodic electrode plate 3, the lead dioxide sheet (the catalyst layer 5), the PEM 2, the cathodic electrode plate 4 and the cathodic collector plate 9 are superposed in that order and compressed together to complete the electrolysis cell element 1.

Examination of Performance of Electrolysis Cell Element

Water was passed through the electrolysis cell element 1 thus fabricated and a current was supplied across the anodic electrode plate 3 and the cathodic electrode plate 4 for electrolysis of water. A comparative electrolysis cell element was fabricated. The comparative electrolysis cell element was the same in construction as the electrolysis cell element 1 of the present invention except that the lead dioxide layer of the comparative electrolysis cell element was formed by an electrodeposition process. The same current as that supplied to the electrolysis cell element 1 was supplied to the comparative electrolysis cell element. A voltage applied across the electrode plates 3 and 4 of the electrolysis cell element 1 was 0.5 V less than that applied across the electrode plates of the comparative electrolysis cell element. It was known from this voltage difference that an amount of electric energy corresponding to the additional voltage drop of 0.5 was converted into heat in the comparative electrolysis cell element, that the ozone generating efficiency of the electrolysis cell element 1 of the present invention is far higher than that of the comparative electrolysis cell element, and that the electrolysis cell element 1 of the present invention reduces the adverse effect of heat.

The electrolysis cell element 1 of the present invention was disassembled after the experimental use and the lead dioxide sheet was inspected by visual observation. The color of the surface of the lead dioxide sheet was dark brown before use. The color of the entire surface of lead dioxide sheet was black after use, which proved that the electric current was distributed uniformly over the entire surface of the lead dioxide sheet. The lead dioxide sheet, i.e., the catalyst layer, adhered firmly to the surface of the PEM 2. It is inferred that the PEM 2 was formed of a fluorocarbon resin and the PTFE contained in the lead dioxide sheet was a kind of fluorocarbon resin and the affinity between the PEM 2 and the lead dioxide sheet made the lead dioxide sheet adhere to the PEM 2.

Other Embodiments

In the foregoing embodiment, the mixture of lead dioxide powder and liquid PTFE is applied to the paraffin paper sheet in a film to make the paraffin paper sheet absorb the dispersion medium for quick drying. However, the film of the mixture may be formed on any other suitable plate made of metal, resin or other material, provided that the film of the mixture can be peeled off the plate after drying. Or, in order to omit the step of peeling off, the film of the mixture may be formed directly on the PEM or the anodic electrode plate. Naturally, the film of the mixture may be formed by a coating method other than a roll coating method. In a further different embodiment, a sheet of the mixture may be formed by molding using a mold.

Advantages of the Invention

The electrolysis cell element of the electrolysis cell according to the present invention is provided with the novel lead dioxide sheet, i.e., the catalyst layer, sandwiched between the anodic electrode plate and the solid electrolytic film. The lead dioxide sheet, i.e., the catalyst layer, can be formed by cutting the flexible sheet of a large area coated with the lead dioxide film in a shape corresponding to the electrode. This lead dioxide sheet is suitable for both the mass production of electrolysis cells and the small-scale multiproduct production of electrolysis cells and is capable of reducing the manufacturing cost.

The lead dioxide sheet of the present invention, differing from those conventional lead dioxide films formed by electrodeposition, is not subject to deterioration by aging. Therefore, the performance of the lead dioxide sheet is not dependent on time of storage before use and operating condition, and the lead dioxide sheet enhances the reliability of the electrolysis cell.

The lead dioxide sheet, i.e., the catalyst layer, of the electrolysis cell of the present invention is formed at temperatures not higher than 100° C. and is sandwiched between the anodic electrode plate and the solid electrolytic film. Therefore, lead dioxide is not subject to the decomposition, which often occurs when lead dioxide is subjected to hot pressing, and hence the lead dioxide sheet enhances the reliability of the electrolysis cell.

When the lead dioxide sheet is formed by one of the foregoing suitable processes that applies the mixture in a film to the surface of a suitable plate and dries the film, the dried lead dioxide sheet can be stored on the suitable plate for a long period of time. When the mixture is applied to a paper sheet, the dispersion medium contained in the mixture volatilizes through the back surface of the paper sheet, the dispersion medium can be completely removed, and the film of the mixture can be evenly dried in a short drying time.

Since the mixture can be applied to the solid electrolytic film and the anodic electrode plate, the present invention is able to cope with various conditions resulting from various factories for fabrication of electrolysis cells.

What is claimed is:

1. An ozone generating electrolysis cell comprising:
    an anodic electrode plate having a surface that is covered with a layer consisting of platinum, with said anodic electrode being a conductive structure that is permeable to gas and liquid;
    a cathodic electrode plate;
    a membrane sandwiched between said anodic electrode plate and said cathodic electrode plate; and
    an ozone generating catalyst layer between said membrane and said anodic electrode plate such that said ozone generating catalyst layer is in contact with said layer consisting of platinum, with said ozone generating catalyst layer including a mixture of lead dioxide and PTFE.

2. The ozone generating electrolysis cell according to claim 1, wherein said ozone generating catalyst layer includes said PTFE in an amount of about 5% by weight of said lead dioxide.

3. The ozone generating electrolysis cell according to claim 1, wherein said membrane comprises a solid electrolytic film.

4. The ozone generating electrolysis cell according to claim 3, wherein said ozone generating catalyst layer includes said PTFE in an amount of about 5% by weight of said lead dioxide.

5. The ozone generating electrolysis cell according to claim 3, wherein said ozone generating catalyst layer is produced, in an environment that has a temperature no greater than 100 C, by
    (i) kneading a mixture of a PTFE dispersion, lead dioxide powder and a volatile dispersion medium into a kneaded mixture,
    (ii) shaping or spreading the kneaded mixture into a sheet, and
    (iii) fully volatilizing the dispersion medium from the sheet.

6. The ozone generating electrolysis cell according to claim 5, wherein said ozone generating catalyst layer includes said PTFE in an amount of about 5% by weight of said lead dioxide.

7. The ozone generating electrolysis cell according to claim 5, wherein the shaping or spreading of the kneaded mixture into a sheet includes shaping or spreading the kneaded mixture into a sheet on a plate, and the production of the ozone generating catalyst layer further comprises peeling the sheet from the plate after the dispersion medium has been fully volatilized and then sandwiching the sheet between said anodic electrode plate and said membrane.

8. The ozone generating electrolysis cell according to claim 7, wherein said volatile dispersion medium is capable of dispersing the PTFE dispersion and lead dioxide powder at a temperature not greater than 100 C.

9. The ozone generating electrolysis cell according to claim 8, wherein said volatile dispersion medium comprises one of ethanol and isopropyl alcohol.

10. The ozone generating electrolysis cell according to claim 9, wherein said volatile dispersion medium comprises ethanol present in a volume generally equal to the volume of the PTFE dispersion and lead dioxide.

11. The ozone generating electrolysis cell according to claim 7, wherein said ozone generating catalyst layer includes said PTFE in an amount of about 5% by weight of said lead dioxide.

12. The ozone generating electrolysis cell according to claim 5, wherein the shaping or spreading of the kneaded mixture into a sheet includes shaping or spreading the kneaded mixture into a sheet on said membrane.

13. The ozone generating electrolysis cell according to claim 12, wherein said volatile dispersion medium is capable of dispersing the PTFE dispersion and lead dioxide powder at a temperature not greater than 100 C.

14. The ozone generating electrolysis cell according to claim 13, wherein said volatile dispersion medium comprises one of ethanol and isopropyl alcohol.

15. The ozone generating electrolysis cell according to claim 14, wherein said volatile dispersion medium comprises ethanol present in a volume generally equal to the volume of the PTFE dispersion and lead dioxide.

16. The ozone generating electrolysis cell according to claim 12, wherein said ozone generating catalyst layer includes said PTFE in an amount of about 5% by weight of said lead dioxide.

17. The ozone generating electrolysis cell according to claim 5, wherein the shaping or spreading of the kneaded mixture into a sheet includes shaping or spreading the kneaded mixture into a sheet on said anodic electrode plate.

18. The ozone generating electrolysis cell according to claim 17, wherein said volatile dispersion medium is capable of dispersing the PTFE dispersion and lead dioxide powder at a temperature not greater than 100 C.

19. The ozone generating electrolysis cell according to claim 18, wherein said volatile dispersion medium comprises one of ethanol and isopropyl alcohol.

20. The ozone generating electrolysis cell according to claim 19, wherein said volatile dispersion medium comprises ethanol present in a volume generally equal to the volume of the PTFE dispersion and lead dioxide.

21. The ozone generating electrolysis cell according to claim 17, wherein said ozone generating catalyst layer includes said PTFE in an amount of about 5% by weight of said lead dioxide.

22. The ozone generating electrolysis cell according to claim 5, wherein said volatile dispersion medium is capable of dispersing the PTFE dispersion and lead dioxide powder at a temperature not greater than 100 C.

23. The ozone generating electrolysis cell according to claim 22, wherein said volatile dispersion medium comprises one of ethanol and isopropyl alcohol.

24. The ozone generating electrolysis cell according to claim 23, wherein said volatile dispersion medium comprises ethanol present in a volume generally equal to the volume of the PTFE dispersion and lead dioxide.

* * * * *